Figure 1:
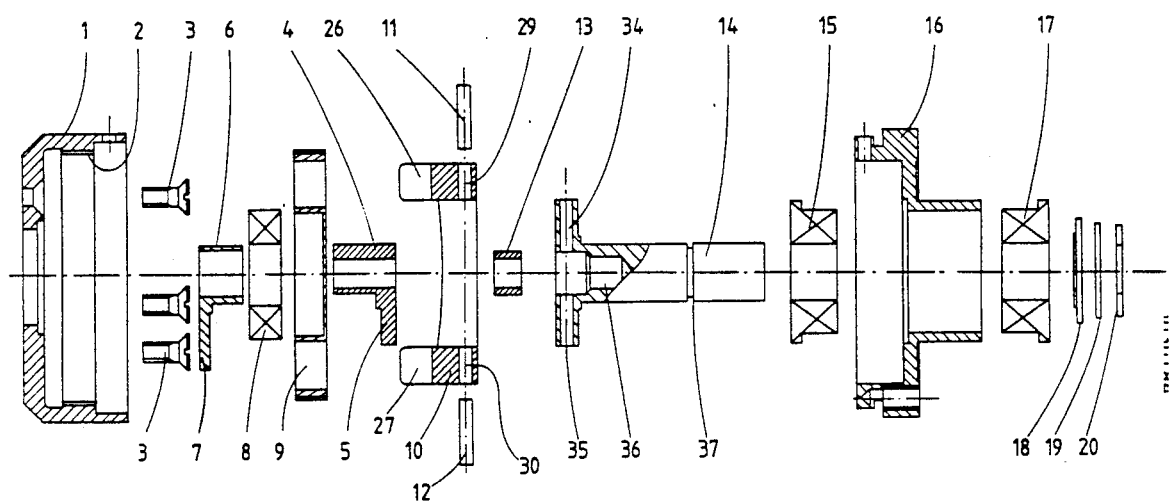

United States Patent [19]

Rennerfelt

[11] Patent Number: 5,030,184
[45] Date of Patent: Jul. 9, 1991

[54] ECCENTRIC GEAR

[76] Inventor: Gustav Rennerfelt, Nilstorpsvägen 53, Lidingö, Sweden

[21] Appl. No.: 392,526
[22] PCT Filed: Jan. 26, 1988
[86] PCT No.: PCT/SE88/00027
§ 371 Date: Jul. 21, 1989
§ 102(e) Date: Jul. 21, 1989
[87] PCT Pub. No.: WO88/05508
PCT Pub. Date: Jul. 28, 1988

[30] Foreign Application Priority Data

Jan. 26, 1987 [SE] Sweden ............................. 8700291

[51] Int. Cl.$^5$ .............................................. F16H 1/28
[52] U.S. Cl. ...................................... 475/162; 475/904
[58] Field of Search ............... 475/162, 163, 178, 179, 475/904; 74/411, 460, 603

[56] References Cited

U.S. PATENT DOCUMENTS

| | | | |
|---|---|---|---|
| 1,770,035 | 7/1930 | Heap et al. | 475/178 X |
| 3,019,705 | 2/1962 | Wilkinson | 475/3 |
| 3,037,400 | 6/1962 | Sundt | 475/180 |
| 3,424,036 | 1/1969 | Colgan | 475/162 X |
| 3,546,972 | 12/1970 | Morozumi | 475/904 X |
| 4,402,544 | 10/1983 | Bähnng | 475/162 X |
| 4,512,213 | 4/1985 | Newton | 475/178 X |

FOREIGN PATENT DOCUMENTS 8000029 5/1980 European Pat. Off. .
204384 5/1960 Sweden .

Primary Examiner—Allan D. Herrmann
Assistant Examiner—Khoi O. Ta
Attorney, Agent, or Firm—Witherspoon & Hargest

[57] ABSTRACT

An eccentric gear comprising a stationary gear wheel (2) and an eccentric gear wheel (9). The eccentric wheel is freely mounted on the input shaft and is driven round by eccentric means (4, 6) causing the eccentric wheel to roll round the internal teeth on the stationary wheel. A driving dog transmits the slow rotation of the eccentric wheel to an output shaft (14). Distinguishing for the invention is that the teeth are corrected such that the eccentric wheel is adjusted with the aid of the two eccentric means such that there is practically no backlash. A computer calculated least clearance between respective top lands on the teeth is obtained with respect to tooth meshing. The eccentric means comprises two cylindrical sleeves arranged eccentrically one in the other. At one end part of each of the sleeves, one of which is arranged eccentrically in the other, there is a radially outstanding tongue (5, 7). These tongues serve as counterweights balancing the imbalance moment of the satellite gear wheel which is due to its eccentric mounting on the input shaft. Backlash and play are eliminated by turning the sleeves of the eccentric means relative to each other.

6 Claims, No Drawings

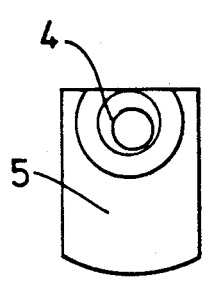
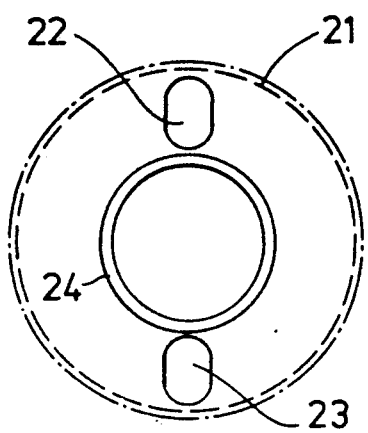
Fig. 2
Fig. 3
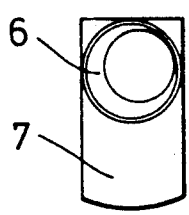
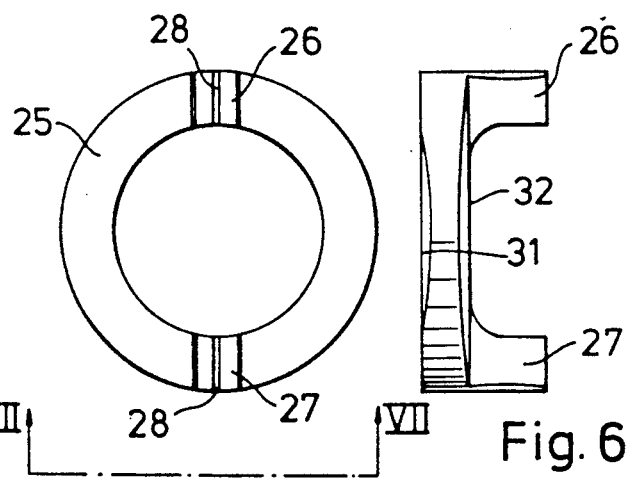
Fig. 4
Fig. 5
Fig. 6
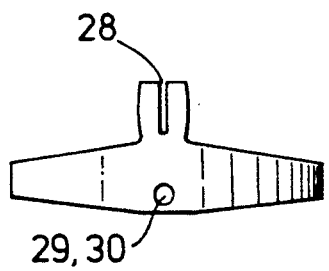
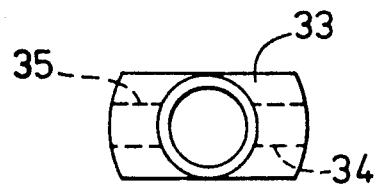
Fig. 7
Fig. 8

ECCENTRIC GEAR

The present invention relates to an excentric gear of the kind which allows high reduction, while the volume of the gear is small. A gear of this kind has an excentric spur gear, also known as a satellite wheel or planet wheel, which is freely journalled on an excentric stub shaft rotating together with the input shaft of the gear. The excentric gear wheel is in mesh with a stationary, internally toothed gear wheel and rolls round on the internal surface thereof. The excentric gear wheel has a circumference which is somewhat less than that of the stationary gear wheel, and as it rolls round on the inside of the stationary gear wheel it executes a slow rotation about its journal on the excentric stub shaft simultaneously as its centre of gravity rotates at a great rotational rate about the input shaft.

The excentric wheel has a number of teeth which is less than that of the stationary gear wheel. For one revolution of the input shaft the excentric wheel has rotated in the opposite direction an angle responsive to the relationship between the number of teeth on the respective gear wheel.

$$\text{Gear ratio (reduction) } i = -\frac{Z_r}{Z_s - Z_r}$$

$Z_s$ = number of teeth on stationary gear wheel
$Z_r$ = number of teeth on the excentric gear wheel It will be understood that to obtain a large gear ratio the difference in the number of teeth should be small. But already at a difference of about 8 teeth there is risk of so-called tooth interference. See FIG. 12.

To obtain a large gear ratio, the number of teeth must be great so that the module (size of the tooth) will not be too small. Such gears are used as reduction gears in large ships' engines. Scaling down these gears to sizes suitable as servo gears is practically impossible since the module would be impossibly small.

Harmonic Drive is a type of gear which has managed to avoid the problem of the teeth interfering with each other while maintaining a high gear ratio. In this gear the means corresponding to the moving gear wheel comprise a special thin wall ball race which is pressed on to an elliptical inner former, this ball race then receiving an externally toothed steel ring. This now oval-shaped ring meshes with an internally toothed rigid steel ring, which is also stationary. Thus, in this known apparatus two diametrically opposed parts of the internally toothed ring are in engagement with the elliptical, elastically shaped means. As a result of the elliptical shape, the unmeshing teeth are kept away from the regions where they would otherwise interfere with the teeth of the stationary ring. For this known structure to function well and have small backlash, it is required that very close tolerances on the component parts are maintained, which results in that this gear becomes expensive to produce. Furthermore, both the moment of inertia and the frictional moment for the input shaft are large, which is a disadvantage, e.g. in connection with servo systems.

Cyclo Drive is another gear structure avoiding the interference problem by not utilising teeth with involute cutting, but a kind of cycloid tooth. The stationary internally toothed ring has this cycloid form, and pins axially fastened to a disc on the output shaft roll off the teeth one after the other. The radial forces in this structure are very high, and very tight tolerances on the components are required to obtain small backlash. The greatest disadvantage with this gear is that a superposed pulsation on the output shaft is obtained, i.e. the gear does not give a true angular transmission. The "Dojan" is a variant of this type of gear.

Conventional spur gear boxes comprise a plurality of reduction stages. The greater the total gear ratio desired, the greater the number of reduction stages. This gear box thus comprises a plurality of reduction stages connected in series. The total gear ratio is the product of the gear ratios in the participating reduction stages. In order that the gear box is not given a too large radial extension, gear ratios of more than 6:1 are seldom used in each stage. In practice, about four reduction stages are required to obtain a gear ratio of 100:1. The disadvantage with this chain of reduction stages is that only a few teeth are simultaneously in mesh in each reduction stage. The gearing is resilient and the total backlash is large. This gearing type is not suitable in servo systems, where it is important that the gearing has small backlash and great rigidity.

So-called differential gearing is often used for achieving large reductions. Such gearing usually comprises a planet gear in which the sun wheel is driven at a given rotational rate and the outer, internal gear is driven in the opposite direction at approximately the same rate. There thus occurs a revolutionary rate difference which can be taken out from the planet wheel directly on the output shaft. The great disadvantage with this gearing is that it has a very low efficiency. If the rotational rate difference is very small, the unuseful power can attain almost at 100%. Since it is also desired here that the gearing shall have small backlash, tight manufacturing tolerances are required.

The present invention has the object of achieving an excentric gearing of the kind mentioned in the introduction, with a one-tooth difference in the number of teeth. The gearing shall have great reduction, low frictional moment, low moment of inertia for the input shaft, dynamically balances operation, negligible backlash and high rigidity.

The invention also discloses a method of graphically configurating the teeth of the stationary and excentric gear wheels in an excentric gear in accordance with the invention. By this graphic configuration of the gear wheels, it will be possible to select the difference in the number of teeth of the two gear wheels to be the least possible, i.e. 1, whereby the reduction will be the greatest possible, simultaneously as the number of teeth in mesh will be maximum and the gear thus rigid.

The distinguishing features for the invention are apparent from the accompanying claims. The invention enables obtaining very small backlash with normal workshop tolerances between the two gear wheels of the excenter gear. For the one-tooth difference in the number of teeth, the teeth must have shifted profiles, as well as being stubbed and possibly having the pressure angle corrected. This correction must be made taking into account that the length of engagement between the teeth in mesh shall not be too small. A short meshing length reduces the power possible to transmit by the gear. At the same time, the clearance between the the tooth faces must not be too tight. These two factors must be weighed against each other. A condition for practically being able to use the corrected gear wheel teeth is in other words that the excentric means eliminates certain manufacturing tolerances. Tooth interference will otherwise be obtained.

The invention permits manufacturing of a reduction gear with small backlash, but not a gear with large backlash.

Figure 9:
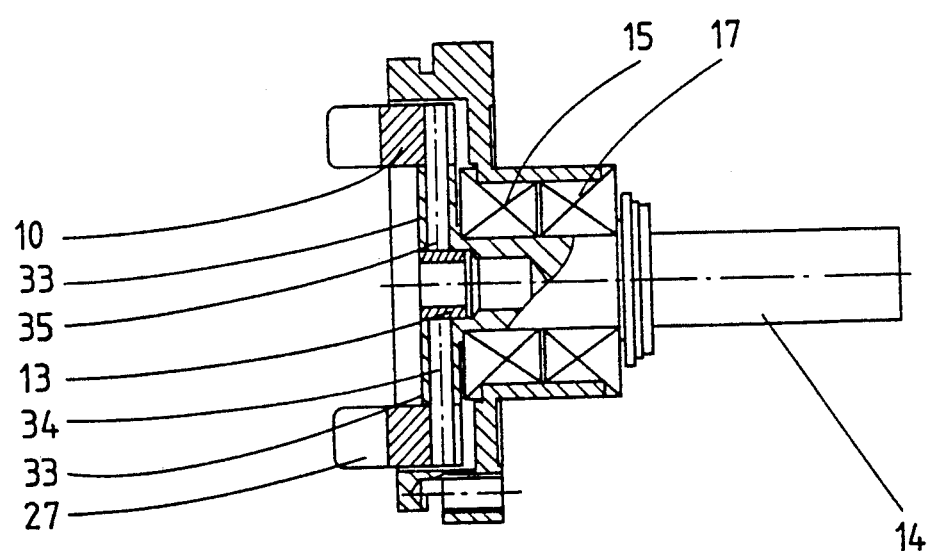
Figure 10:
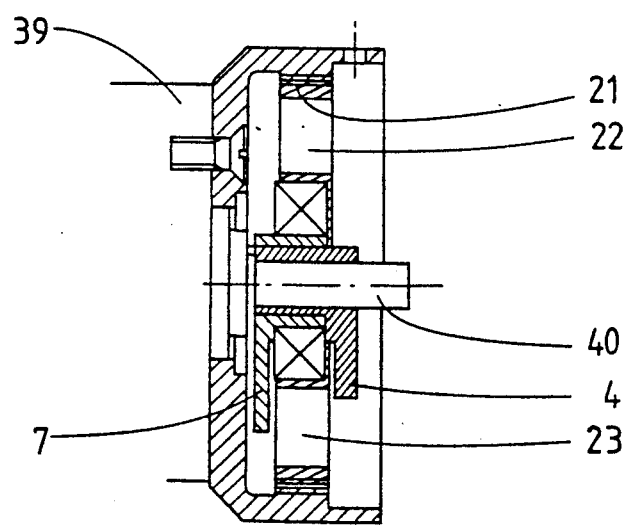
Figure 11:
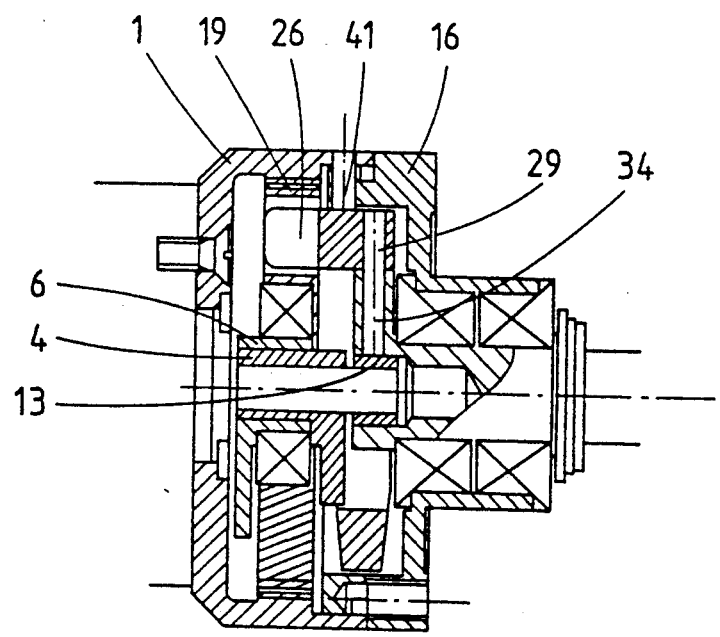
Figure 12:
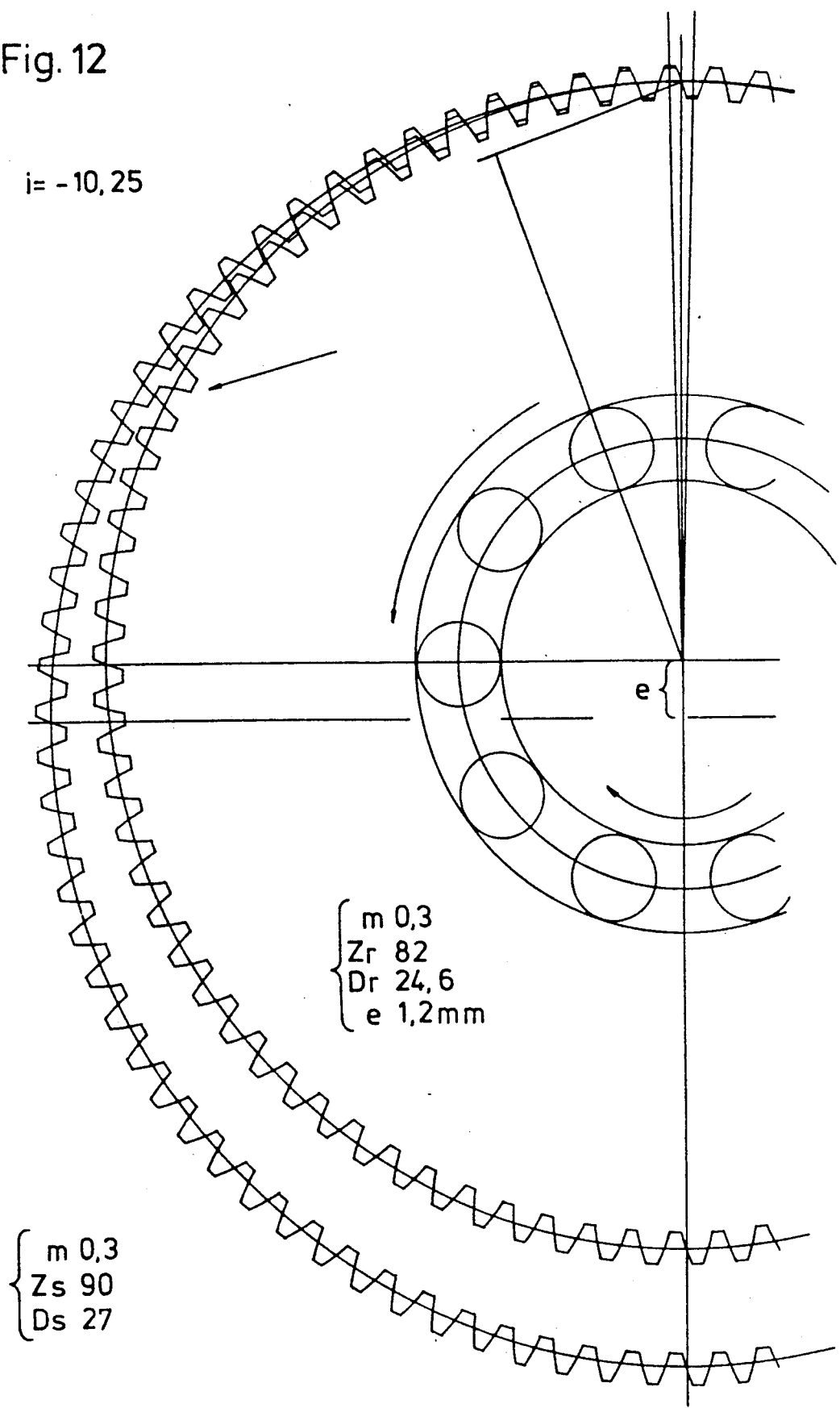
Figure 13:
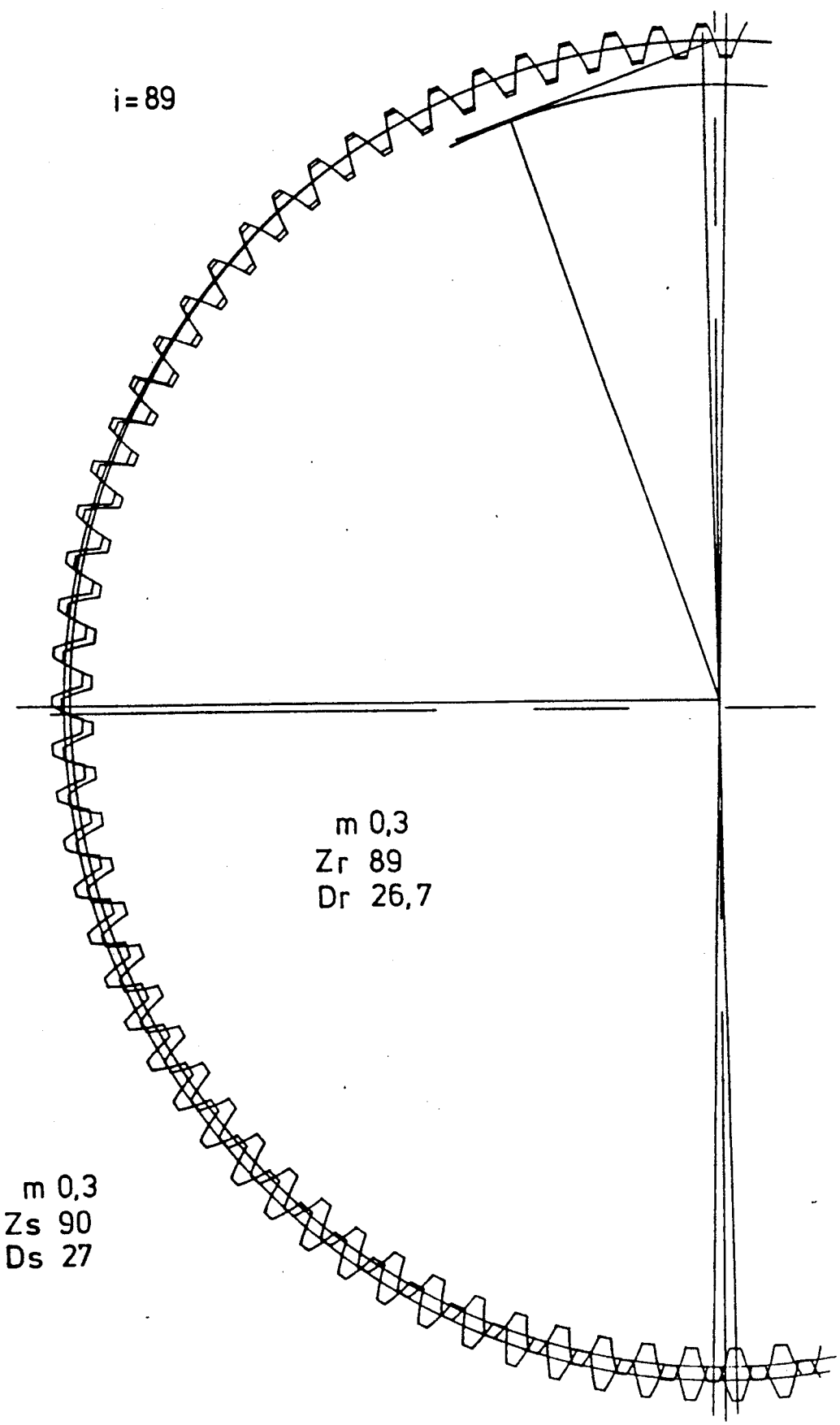
Figure 14:
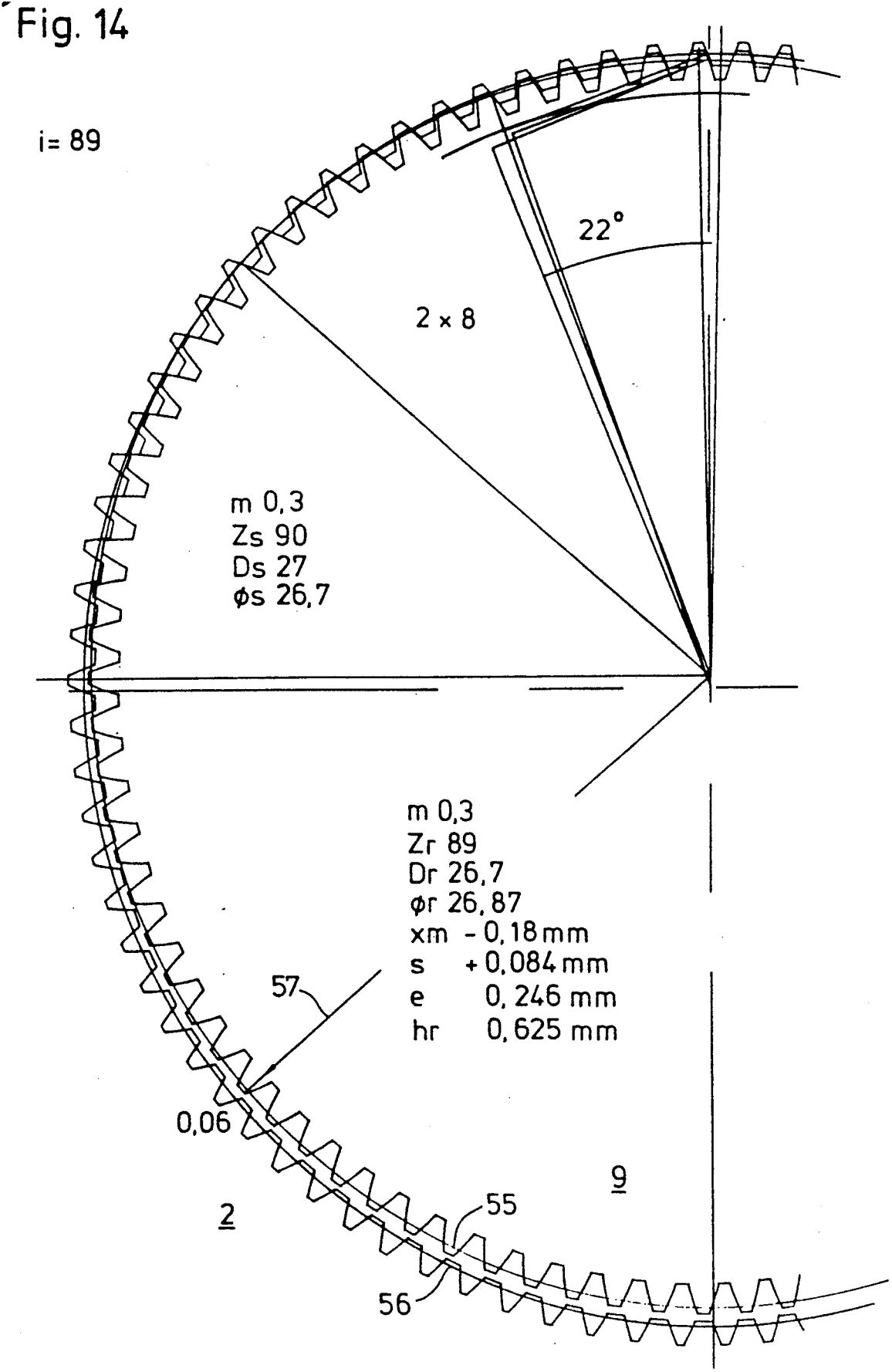
Figure 15:
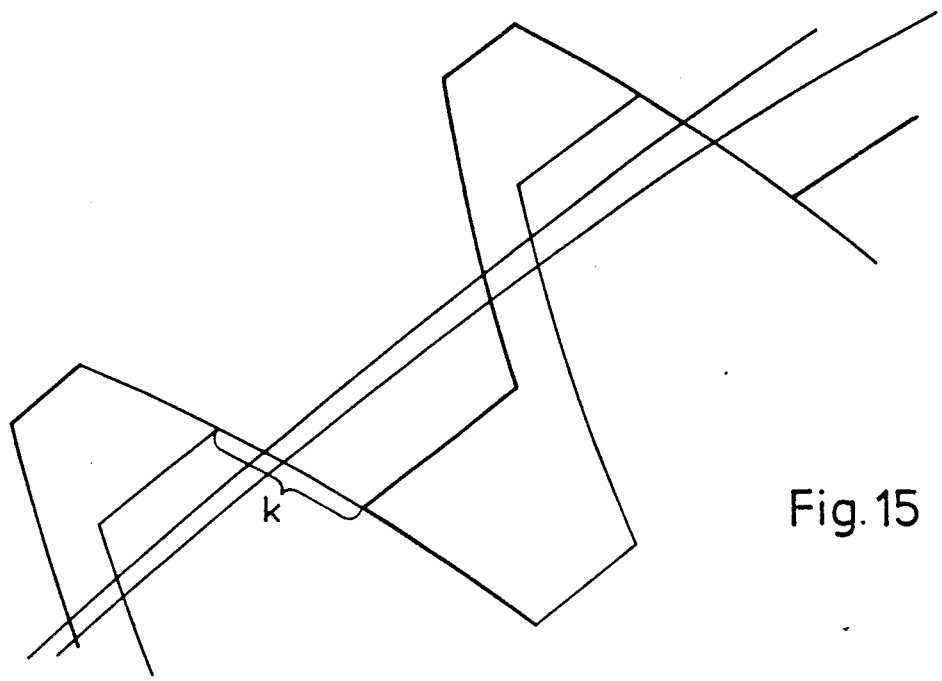
Figure 16:
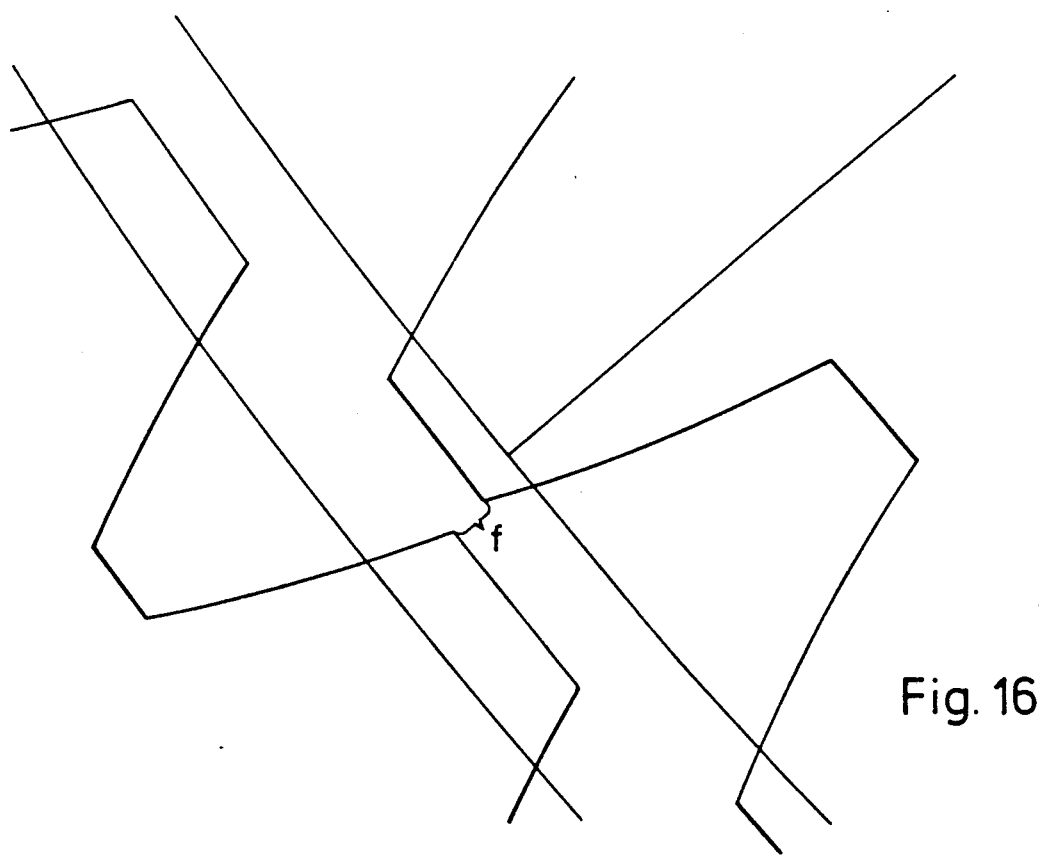

Different embodiments of the invention will now be described in more detail in connection with the accompanying drawings where, FIG. 1 is an exploded view of a first embodiment of an excentric gear in accordance with the present invention, FIG. 2 is a front view of a first excentric means, FIG. 3 is a front view of the excentric gear wheel, FIG. 4 is a front view of a second excentric means, FIG. 5 is a front view of a driving dog, FIG. 6 is a side view of the driving dog illustrated in FIG. 5, FIG. 7 is a side view of the driving dog in FIG. 5, along the line VII—VII in FIG. 5, FIG. 8 is a front view of the output shaft, FIG. 9 is a longitudinal cross section of the gear output shaft in an assembled condition, FIG. 10 is a longitudinal cross section of the gear input part in an assembled condition, FIG. 11 is a longitudinal cross section of the assembled input and parts of FIGS. 9 and 10, FIG. 12 depicts meshing of teeth in an excentric gear with uncorrected teeth and a tooth difference of 8 teeth, FIG. 13 depicts meshing of teeth in an excentric gear with uncorrected teeth and a tooth difference of 1 tooth, FIG. 14 depicts meshing of teeth in an excentric gear, with a tooth difference of 1 tooth, the teeth having been corrected by profile shifting, stubbing and modification of pressure angle, FIG. 15 is an enlarged depiction of tooth meshing with engagement length, FIG. 16 is an enlarged depiction of a region illustrating a pair of teeth with clearance dimensions.

The excentric gear includes a cylindrical housing 1 with a stationary gear wheel 2 having internal teeth, the wheel being made integrally with the housing 1. A plurality of screws 2 are intended for use in fitting the gear to the endwall of a motor. The excentric gear further includes: a first excentric means 4 with a first counterweight 5, a second excentric means 6 with a counterweight 7, a first ball bearing 8, an excentric gear wheel 9, also termed satellite wheel, an output shaft 10, two pivot pins 11, 12, a bush 13, a driving dog 14, a second ball bearing 15, a bearing housing 16, a third ball bearing 17, a washer 18, a shims washer 19 and a circlip 20.

It will be seen from FIG. 2 that the first excentric means 4 has a counterweight 5 in the form of a tongue projecting radially like a flange, and situated at one end of the sleeve 4 forming the mounting of the excentric means. The second excentric means 6 illustrated in FIG. 4 has a similar configuration as the means 4 and is therefore not described in detail. The sleeve of the second excentric means 6 has less excentricity than that of the first excentric means 4. FIG. 3 is a front view of the excentric gear wheel 9 with its teeth 21. This wheel has two diametrically opposing openings or "tooth gaps" 22, 23 in its side surface facing towards the driving means. The wheel is also provided on this side with an outstanding annular ring 24 accommodating the first ball bearing 8.

It will be seen from FIGS. 5–7 that the driving dog includes an annular ring part 25, on one side of which projects two diametrically opposed lugs or teeth 26, 27. These lugs are intended to slide reciprocatingly in the elongate openings 22, 23 on the excentric gear wheel. To ensure freedom from play in this motion, each lug is provided with a slit 28, clearly shown in FIG. 7. There are two radial through bores 29, 30 in the annular ring, these bores being diametrically opposed and with the same angular position as the pins 26, 27 on the annular ring 25. These bores are intended to receive the pivot pins 11 and 12. The driving dog 10 also has bevelled parts 31 and 32 forming either side surface of the annular ring.

The output shaft 14 associated with the driving dog is provided with a flange 33 of a radial extension allowing it to be accommodated within the annular ring part 25 of the driving dog. This flange is provided with two diagonally disposed bores 34, 35 for the pivot pins 11 and 12, which are a press fit in the bores. The output shaft is thus pivotably mounted on the pivot pins 11, 12. As will be seen from FIGS. 1 and 8, the output shaft has a central bore 36 for accommodating the bush 13 at its end provided with the flange 33. An annular groove 37 for the circlip 20 is arranged on the output shaft a distance away from the flange 33. The output part of the gear is assembled in the following way: The pivot pins 11, 12 are first thrust into the bores 29, 30 on the driving dog and into the bores 34, 35 on the output shaft flange. The bush 13, serving as a bearing for the not yet described input shaft to the excentric gear is pushed into the central bore 36 on the output shaft. The second ball bearing 15 is then mounted on the output shaft and subsequently thrust into the bearing housing 16. The third ball bearing 17 is then mounted on the output shaft from the outside of the bearing housing 16. The washer 18 and the shims washer 19 are then placed on the shaft, the whole assembly being locked in place by the circlip 20. The completed assembly illustrated in FIG. 9 is thus prestressed and thus constitutes the output part of the gear.

The input part of the gear is assembled in the following way: The housing 1 is screwed by the screws 3 onto the end wall of a motor 39 with an output shaft 40, illustrated schematically in FIG. 10, this shaft thus constituting the input shaft of the gear. The first ball bearing 8 is then glued into the excentric gear wheel 9. A suitable glue is Araldite or Locktite. The exterior cylindrical part of the sleeve in the second excentric means 6 is then coated with glue and the means thrust into the inner ring of the ball bearing 8. Glue is then applied to the exterior cylindrical surface of the sleeve pertaining to the first excentric means 4 and this excentric means is thrust from the other side of the excentric gear wheel into the second excentric means 6, these two means 4 and 6 then assuming a mutual angular position such that the combined excentricity is minimum. Glue is then applied to the internal cylindrical surface of the sleeve of the excentric means 4 and the whole unit 4, 6, 8, 9 is thrust onto the output shaft 40 of the motor. Glue is then removed from the part of the shaft 41 projecting out over the upper surface of the first excentric means 4 and its counterweight 5. The excentric means 4 and 6 are then turned relative each other, causing the excentricity to increase, until there is no backlash between the teeth on the excentric wheel 2 and those of the fixed gear wheel 2, with which the excentric wheel is in mesh. The glue is then allowed to harden. By turning the excentric means relative each other in this way, all backlash is reduced to a minimum, and thereby manufacturing tolerances for the excentric and fixed gear wheels as well as the excentric means are eliminated. The only throw which now exist is that in the ball bearing 8, and since this normally is not greater than about 5 μm it can be said that all backlash in the gear has been eliminated.

FIG. 10 illustrates the unit which is obtained when the input part of the gear is mounted in the described manner. The input and output parts are then fitted together into the unit illustrated in FIG. 11. The bearing housing 16 is fixed to the housing 1 by the radial pins 41, set screws or the like.

It should be noted that the excentric gear wheel is freely mounted on the motor shaft. If the gear ratio of the gear is 89, this means that when the input shaft has rotated 89 revolutions the excentric wheel has rotated one revolution in the opposite direction. Since the excentric wheel rotates synchronously with the output shaft, the polar moment of the inertia of the output shaft as reduced to the input shaft (=the output shaft of the motor), is negligible, since the gear ratio participates with a factor to the power of two.

The moment of the inertia J of the system can be regarded as comprised of the moment of inertia on the output shaft, driving dog and excentric wheel, all three being reduced to the input shaft by dividing by the square of the gear ratio (i). This resulting moment of inertia is negligible. The total moment of inertia of the system is therefore solely the mass of the excentric wheel multiplied by the square of the excentricity. Furthermore, there is the moment of inertia of the counterweights 5, 7 which should be dominating. The rotation radius of the balancing mass should be kept low so that its effect on the moment of inertia of the output shaft will be small. For a typical excentric gear wheel, the moment of inertia $J=0,046\times 10^{-8}$ kgm$^2$ and the moment of inertia of the counterweights $J=0,8\times 10^{-8}$ kgm$^2$, the total moment of inertia, $J=0,9\times 10^{-8}$ kgm$^2$. This total moment of inertia is thus the one for the input shaft and this value should be compared with the input moment of the inertia for the Harmonic gear which is stated to be $15\times 10^{-8}$ kgm$^2$ for the corresponding gear size. In spite of the excentric gear wheel having low rotational rate, its centre of gravity rotates with the high rotational rate of the input shaft 40.

FIG. 12 illustrates certain conditions in a conventional excentric gear. The excentric gear wheel is freely mounted on the excentric stub shaft of the input shaft with the excentricity e. The pitch diameters are here 27 and 24, 6, the tooth module 0,3 and the number of teeth 90 and 82. The difference in the number of teeth is thus 8. This gives a rather small gear ratio i=−10,25. It can however be seen that here already there is danger of cog interference in an area the extremity of which is denoted by an arrow.

FIG. 13 illustrates an uncorrected excentric gear of the same type as in FIG. 12, but with a tooth difference of 1 tooth. The gear ratio is 89:1. It will be seen that there is heavy cog interference, which is apparent from the area between 6 and 9 o'clock.

FIG. 14 shows the same gear as in FIG. 13, but corrected. The tooth difference is one tooth. The gear ratio is 89:1. Modification by profile shifting xm=−0,18 mm, stubbing and pressure angle change to 22 degrees. The tooth face clearance is here 0.06 mm. Theoretically, only one tooth par in each loading direction is simultaneously in mesh. In practice, the teeth are slightly resilient during loading and one can therefore reckon with about 8 teeth being simultaneously in mesh in the load direction, which gives very good load distribution.

FIG. 14 shows the result of the method proposed in accordance with the invention for graphical reproduction of teeth, for a fixed internally toothed gear wheel and an excentric gear wheel in the excentric gear according to the invention. The fixed wheel is denoted by 2 and the excentric wheel by 9. The pitch circle of the excentric wheel is denoted by 55 and that of the fixed wheel by 56.

As input data for the graphical reproduction there is used the desired gear ratio for the excentric gear, in this case 89. As an input value for the calculations, the approximate pitch diameter 56 (denoted by $D_s$ in FIG. 14) is also given, and in this case it has been selected to 27 mm. As the last input value there is also given the desired value of the tooth module (reciprocal of the diametral pitch) in this case m=0,3. A first approximate value of the pitch diameter of the fixed wheel is then calculated from these three input values. These values are also used for calculating a first basic excentricity $e_0$ which is equal to half the pitch diameter $D_s$ for the fixed wheel reduced by half the pitch diameter $D_r$ for the excentric wheel. The number of teeth ($Z_r$ and $Z_s$) is calculated for each wheel. If the number of teeth is not an integer, the pitch diameter 56 is changed and the process repeated. When the number of teeth is an integer the teeth of the the two gear wheels are drawn (FIG. 13) suitably using CAD, to a considerably enlarged scale, as illustrated in FIGS. 15 and 16 and the areas with potential cog interference are inspected. The areas where the teeth are in mesh are satisfactory, but where they start to mesh it must be arranged that the faces of the respective teeth do not collide, and that the top lands of the teeth do not collide. To correct such undesirable collisions, a profile shift is arranged, such that the basic excentricity is changed to a new value $e_0+x.m$ where m is the module and x is a profile shift factor. The top lands of the teeth are stubbed to prevent them from colliding. The teeth of the two gear wheels are then drawn with the teeth corrected in the way mentioned by profile shifting and stubbing. The result is illustrated in FIG. 14. It will be understood that profile shifting does not affect the pitch circles. The teeth thus drawn are inspected, and a least distance between the tooth lands is decided for the teeth which are not in mesh. If this distance is not sufficient for acceptance with regard to non-correctable manufacturing tolerances, the teeth are corrected once again. The reference numeral 57 denotes in FIG. 14 the place where the distance between the two top lands is minimum, namely 0,06 mm, although sufficiently large to avoid collision. As will be seen from FIG. 14, about 8 teeth are in mesh with each other between about 10,30 and 11,30 (clock-face). There is also corresponding meshing on the other half between 12.30 and 1.30, i.e. symmetrically about the vertial axis in FIG. 4. It is thus clear that a large number of teeth are simultaneously in mesh, which increases the rigidity of the gear. It should be noted that meshing takes place in these two areas and that there is clearance in the area around 12 o'clock. This is favourable from the point of view of backlash. Finally, in FIG. 14 $Z_r$ denotes the number of teeth 89 on the excentric gear wheel, $Z_s$ the number of teeth 90 on the fixed gear wheel, $Z_r$ the diameter of the circle the tooth top lands on the satellite gear wheel described and $Z_s$ the diameter of the curve the tooth top lands on the fixed wheel described. As will be seen from FIG. 14, the pitch diameters 55 and 66 cut each other at approximately 11.30, so that the pitch diameter 55 for the excentric wheel is outside the pitch diameter 57 for the fixed wheel in the area between approximaterly 10.30 and 1.30. Since the teeth have been stubbed, there are no collisions with the bottom lands within this area.

FIG. 15 illustrates a tooth pair in mesh. The length variation of the active face width can be determined here. By further enlargement and measurement it can be determined from tooth pair to tooth pain how well the tooth faces nestle against each other, and if it is necessary to make pressure angle corrections.

The tooth top land clearance dimension at 57 in FIG. 14, shown at an enlarged scale as f in FIG. 16, is very important. A dimension which is too small gives risk for tooth interference and puts large demands on the tolerances of the components included. Too large a dimension reduces the meshing length of the teeth.

The graphical method for producing the teeth of the two gear wheels just described is extremely convenient, compared with the very extensive calculation work which would be required in the case where each tooth were to be calculated by itself, and furthermore there would be a poor general impression of the tooth situation. Starting with the graphically produced gear wheels, the gear wheels are then produced using conventional tooth cutting technique.

The embodiments of the invention described above can be modified in many ways and varied within the scope of the inventive concept. Instead of gluing the excentric means to each other, the counterweights can be prodivded with locking elements e.g. pins on one counterweight and grooves or openings on the other one for fixing the relative angular turn between the sleeves of the excentric means. Either of the excentric means 4, 6 can be provided with a balancing weight for statically balancing the imbalance moment of the excentric elements.

I claim:

1. Eccentric gear, comprising:
   an input shaft,
   an output shaft,
   a fixed gear wheel having internal teeth,
   first eccentric means non-rotatably attached to the input shaft,
   second eccentric means mounted on the first eccentric means, the first and second eccentric means, after an initially performed adjustment of their relative angular position in order to eliminate backlash in the gear, being fixed relative to each other in an operative as well as an inoperative mode of the gear, and
   an eccentric gear wheel rotatably mounted on said second eccentric means and having teeth engaging the internal teeth of the fixed gear wheel so as to rotate and revolve upon rotation of the input shaft,
   the teeth of the eccentric gear wheel and the teeth of the fixed gear wheel differing in number by one tooth and being corrected by profile shifting and stubbing for ensuring a predetermined top land clearance.

2. Eccentric gear as claimed in claim 1, characterized in that the first and second excentric means are provided with counterweights for dynamic balancing of the imbalance moment of the excentric units (4, 6, 9).

3. Eccentric gear as claimed in claim 1, characterized in that each excentric means (4, 6) has the form of a cylindrical sleeve having a radially outstanding tongue (5, 7) at one end part, said tongues serving as balance weights and together having a mass balancing out the imbalance moment of the excentric gear wheel (9, 45) caused by its excentric mounting on the input shaft (40).

4. Eccentric gear as claimed in claim 2, characterized in that the balance weights (5,.7) of the excentric means are arranged on either side of the excentric gear wheel (9, 45).

5. Eccentric gear as claimed in clam 1, characterized in that the excentric wheel (9) is journalled with the aid of ball bearings (8) on the second excentric means (6).

6. Method of graphically producing teeth for a fixed internally toothed gear wheel (2) and for an eccentric gear wheel (9) in an excentric gear as claimed in claim 1, the method including the following steps:
   a) determination of desired gear ratio (i) for the excentric gear,
   b) determination of desired value of the tooth module (m) where the module=the ratio of the pitch diameter to the number of teeth,
   c) determinining of approximate pitch diameter ($D_s$) for the fixed gear wheel, characterized by the following steps
   d) calculation of the number of teeth and determination of the pitch diameter of the fixed wheel and of the excentric wheel starting from the initial values in steps a), b) and c)
   e) drawing the teeth of the two gear wheels on a common sheet of drawing paper with guidance from the raw data for the values obtained in step d)
   f) visual inspection of the drawn gear wheels for determining the areas on the wheels where the teeth interfere with each other
   g) graphic determination of the profile shift and stubbing, whereby the basic excentricity $e_O$ is changed to a new value $e_0 - x.m$ where m is the module,
   h) drawing the teeth of the two wheels corrected according to g), and possible residual correction of the excentricity by a factor s, so that at all places round the wheels where the teeth are not in mesh, the top lands of respective teeth will have a predetermined minimum clearance, whereby the total excentricity will be:

$$e_{tot} = e_0 + x.m - s.$$

* * * * *